(12) United States Patent
Marmur

(10) Patent No.: US 8,029,228 B2
(45) Date of Patent: Oct. 4, 2011

(54) CABLE HOISTING APPARATUS

(75) Inventor: Lazar Marmur, Plainsboro, NJ (US)

(73) Assignee: Omaha Standard, Inc., Council Bluffs, IA (US)

( * ) Notice: Subject to any disclaimer, the term of this patent is extended or adjusted under 35 U.S.C. 154(b) by 704 days.

(21) Appl. No.: 11/900,438

(22) Filed: Sep. 11, 2007

(65) Prior Publication Data

US 2008/0219821 A1    Sep. 11, 2008

Related U.S. Application Data

(60) Provisional application No. 60/906,121, filed on Mar. 9, 2007.

(51) Int. Cl.
*B60P 1/00* (2006.01)

(52) U.S. Cl. ........ 414/478; 414/477; 414/494; 414/500; 414/538; 280/400; 280/405.1; 280/656

(58) Field of Classification Search .................. 414/478, 414/494, 500, 538, 477; 280/400, 656, 405.1
See application file for complete search history.

(56) References Cited

U.S. PATENT DOCUMENTS

| | | | |
|---|---|---|---|
| 1,821,327 A | 9/1931 | Scott | |
| 1,885,399 A | 11/1932 | Wren | |
| 2,082,663 A | 6/1937 | Slater | |
| 2,468,502 A | 4/1949 | Lisota | |
| 2,530,350 A | 11/1950 | Ehlert | |
| 2,588,001 A | 3/1952 | Holland | |
| 2,621,814 A | 12/1952 | Lisota | |
| 2,703,658 A | 3/1955 | Bazzell | |
| 2,741,383 A | 4/1956 | Leckert | |
| 3,001,825 A | 9/1961 | Rouse | |
| 3,049,378 A | 8/1962 | Nelson | |
| 3,074,574 A | 1/1963 | Prince | |
| 3,077,278 A | 2/1963 | Alexander | |
| 3,127,041 A | 3/1964 | Flynn et al. | |
| 3,138,276 A | 6/1964 | Allen et al. | |
| 3,144,149 A | 8/1964 | Dempster et al. | |
| 3,195,749 A | 7/1965 | Dempster et al. | |
| 3,214,046 A | 10/1965 | Dempster et al. | |
| 3,231,120 A | 1/1966 | Dempster et al. | |
| 3,272,546 A | 9/1966 | Cooley | |
| 3,302,808 A | 2/1967 | Herpich et al. | |
| 3,399,795 A | 9/1968 | Clucker et al. | |
| 3,467,268 A | 9/1969 | Corompt | |
| 3,485,400 A | 12/1969 | Pewthers | |
| 3,514,000 A | 5/1970 | Kolling et al. | |
| 3,572,563 A | 3/1971 | Oliver | |
| 3,606,059 A | 9/1971 | Haberle, Jr. | |
| 3,638,808 A | 2/1972 | Grey et al. | |
| 3,638,817 A | 2/1972 | Corompt | |
| 3,648,868 A | 3/1972 | Richler | |

(Continued)

*Primary Examiner* — Scott Lowe
(74) *Attorney, Agent, or Firm* — Hodgson Russ LLP

(57) ABSTRACT

A cable hoisting apparatus for loading and unloading of containers with respect to vehicles including a modular assembly allowing the apparatus to be easily attached or detached with respect to the vehicle. This modular assembly includes a subframe directly attachable detachably to the vehicle which includes a reeve cylinder and a lifting cylinder mounted therewithin. A top frame is included which is pivotally movably mounted to the subframe. The lifting cylinder powers pivotal movement of the top frame. Loading and unloading of the container is powered by the reeve cylinder. The reeve cylinder moves a shoe within a shoe track which extends or contracts a cable attached to a container which is positioned about a plurality of sheaves one of which is attached to the slideable shoe. A positively engaging locking construction is included defined between the subframe and the top frame for positively retaining the container.

21 Claims, 10 Drawing Sheets

U.S. PATENT DOCUMENTS

| | | |
|---|---|---|
| 3,712,491 A | 1/1973 | Kreutzer |
| 3,819,075 A | 6/1974 | Derain |
| 3,874,537 A | 4/1975 | Kou |
| 3,892,323 A | 7/1975 | Corompt |
| 3,894,644 A | 7/1975 | Alexander |
| 3,934,740 A | 1/1976 | Rumell |
| 3,964,626 A | 6/1976 | Arregui |
| 3,988,035 A | 10/1976 | Corompt |
| 4,058,231 A | 11/1977 | Visa et al. |
| 4,090,623 A | 5/1978 | Noyon |
| 4,092,755 A | 6/1978 | Hughes |
| 4,109,810 A | 8/1978 | Jones |
| 4,133,439 A | 1/1979 | Goranson |
| 4,175,904 A | 11/1979 | Airaksinen |
| 4,225,280 A | 9/1980 | Brunet et al. |
| 4,344,731 A | 8/1982 | Visa et al. |
| 4,350,469 A | 9/1982 | Corompt |
| 4,352,625 A | 10/1982 | Bolderoff |
| 4,409,903 A | 10/1983 | Wilhelmsson |
| 4,453,878 A | 6/1984 | Paukku |
| 4,455,118 A | 6/1984 | Scharf |
| 4,514,131 A | 4/1985 | Godwin |
| 4,529,349 A | 7/1985 | Lutz |
| 4,548,541 A | 10/1985 | Corompt |
| 4,580,805 A | 4/1986 | Bertolini |
| 4,599,040 A | 7/1986 | Rasmussen |
| 4,645,405 A | 2/1987 | Cambiano |
| 4,704,063 A | 11/1987 | Updike, Jr. et al. |
| 4,755,097 A | 7/1988 | Corompt |
| 4,762,370 A | 8/1988 | Corompt et al. |
| 4,770,592 A | 9/1988 | Winter |
| 4,802,811 A | 2/1989 | Nijenhuis |
| 4,836,735 A | 6/1989 | Dennehy, Jr. et al. |
| 4,840,532 A | 6/1989 | Galbreath |
| 4,848,619 A | 7/1989 | Corompt |
| 4,889,464 A | 12/1989 | Self |
| 4,934,898 A | 6/1990 | Galbreath |
| 4,943,203 A | 7/1990 | Bohata |
| 4,954,039 A | 9/1990 | Johnston et al. |
| 4,986,719 A | 1/1991 | Galbreath |
| 5,007,791 A | 4/1991 | Boughton |
| 5,026,228 A | 6/1991 | Mansfield |
| 5,082,416 A | 1/1992 | Bock |
| 5,088,875 A | 2/1992 | Galbreath et al. |
| 5,163,800 A | 11/1992 | Raisio |
| 5,183,371 A | 2/1993 | O'Daniel |
| 5,203,667 A | 4/1993 | Yoneda et al. |
| 5,203,668 A | 4/1993 | Marmur |
| 5,213,466 A | 5/1993 | Bubik |
| 5,246,329 A | 9/1993 | Farrell |
| 5,246,330 A | 9/1993 | Marmur et al. |
| 5,324,160 A | 6/1994 | Smith |
| 5,460,473 A | 10/1995 | LaMora et al. |
| 5,509,775 A | 4/1996 | Kendall |
| 5,529,454 A | 6/1996 | Alm et al. |
| 5,542,807 A | 8/1996 | Kruzick |
| 5,562,391 A | 10/1996 | Green |
| 5,580,211 A | 12/1996 | Mengel |
| 5,601,393 A | 2/1997 | Waldschmitt |
| 5,660,446 A | 8/1997 | Weatherly |
| 5,662,453 A | 9/1997 | Gerstner et al. |
| 5,678,978 A | 10/1997 | Markham |
| 5,718,554 A | 2/1998 | McElroy |
| 5,725,350 A | 3/1998 | Christenson |
| 5,779,431 A | 7/1998 | Alm et al. |
| 5,795,124 A | 8/1998 | Kitten et al. |
| 5,807,057 A | 9/1998 | Nijenhuis |
| 5,813,824 A | 9/1998 | Zanzig et al. |
| 5,823,733 A | 10/1998 | Kruzick |
| 5,839,864 A | 11/1998 | Reynard |
| 5,848,869 A | 12/1998 | Slocum et al. |
| 5,871,328 A | 2/1999 | Pinkston |
| 5,913,561 A | 6/1999 | Alcorn |
| 5,921,742 A | 7/1999 | Gearhart |
| 5,951,235 A | 9/1999 | Young et al. |
| 5,967,733 A | 10/1999 | Cash |
| 5,996,171 A | 12/1999 | Bowers |
| 6,053,692 A | 4/2000 | Mason et al. |
| 6,068,440 A | 5/2000 | Lang et al. |
| 6,168,371 B1 | 1/2001 | Lesmeister et al. |
| 6,276,890 B1 | 8/2001 | Pratt |
| 6,332,746 B1 | 12/2001 | Lang et al. |
| 6,336,783 B1 | 1/2002 | Young et al. |
| 6,354,787 B1 | 3/2002 | O'Daniel |
| 6,390,761 B1 | 5/2002 | Palmer, Jr. et al. |
| 6,394,734 B1 | 5/2002 | Landoll et al. |
| 6,406,231 B1 | 6/2002 | Landoll et al. |
| 6,406,247 B1 | 6/2002 | Ghiretti et al. |
| 6,419,292 B1 | 7/2002 | Calcote et al. |
| 6,431,577 B1 | 8/2002 | Chapman |
| 6,461,096 B1 | 10/2002 | Mentele et al. |
| 6,511,278 B1 | 1/2003 | Harkcom et al. |
| 6,537,015 B2 | 3/2003 | Lim et al. |
| 6,547,506 B1 | 4/2003 | Jacob |
| 6,558,104 B1 | 5/2003 | Vlaanderen et al. |
| 6,568,892 B2 | 5/2003 | Landoll et al. |
| 6,589,005 B1 | 7/2003 | Hull |
| 6,962,473 B2 | 11/2005 | Scranton et al. |

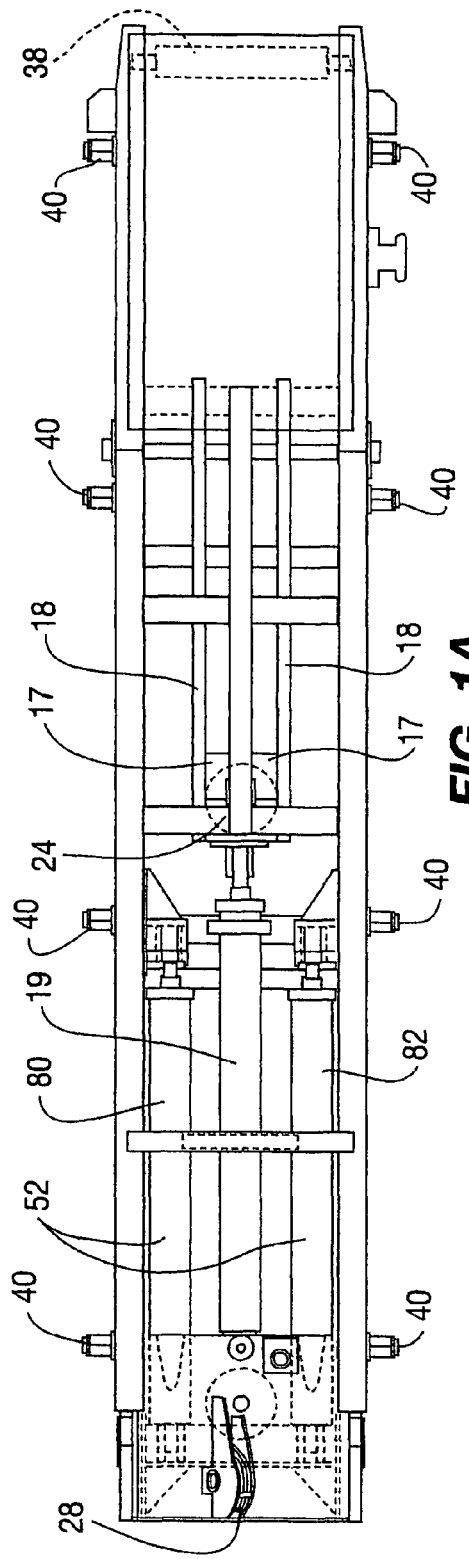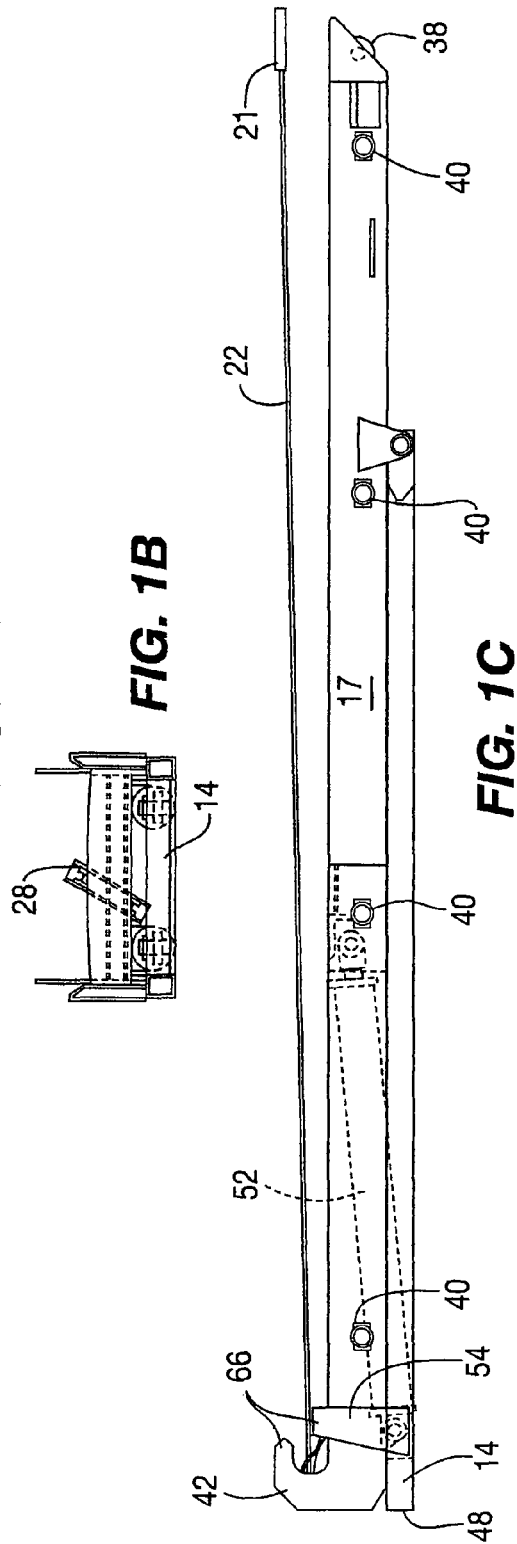
FIG. 1A
FIG. 1B
FIG. 1C

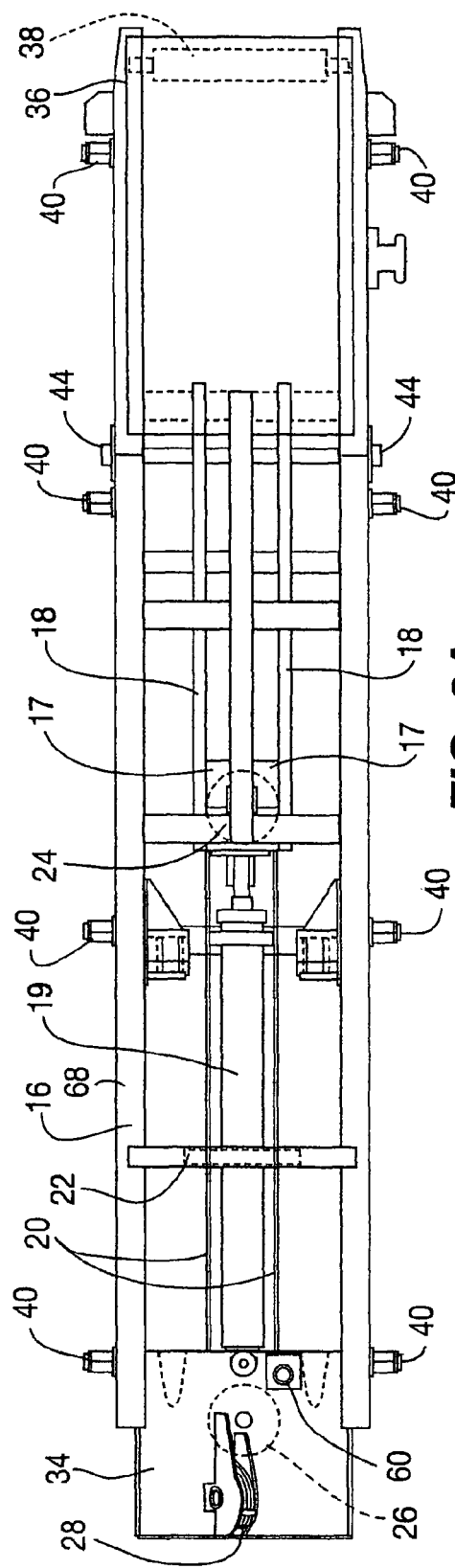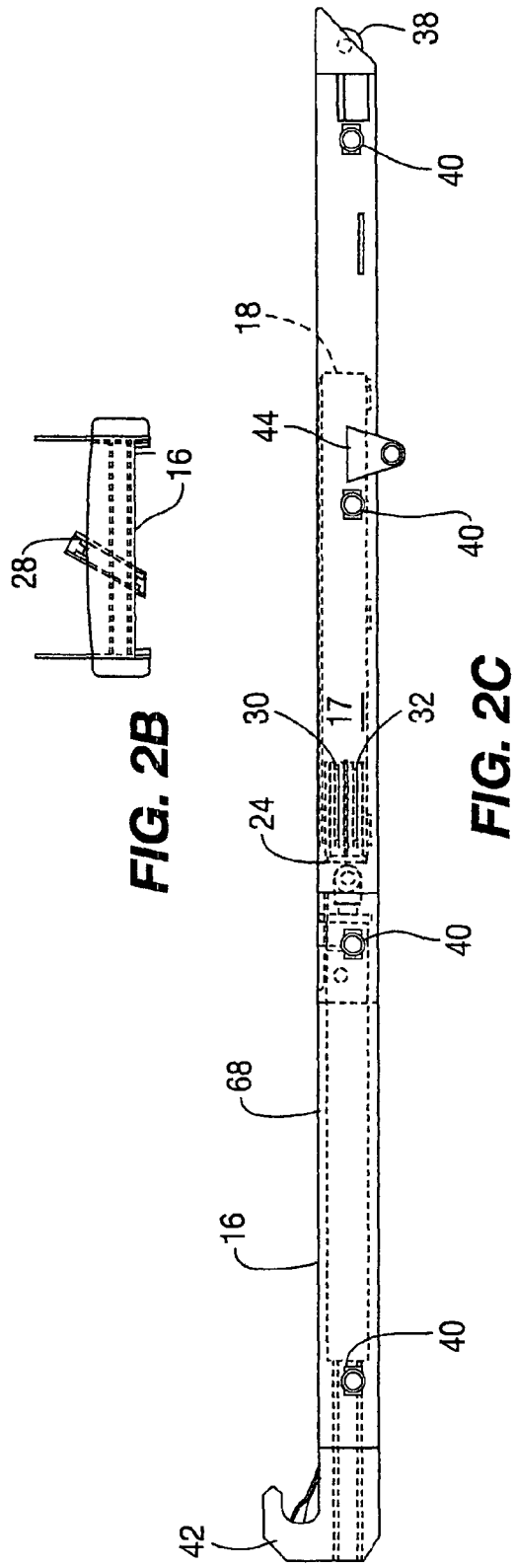

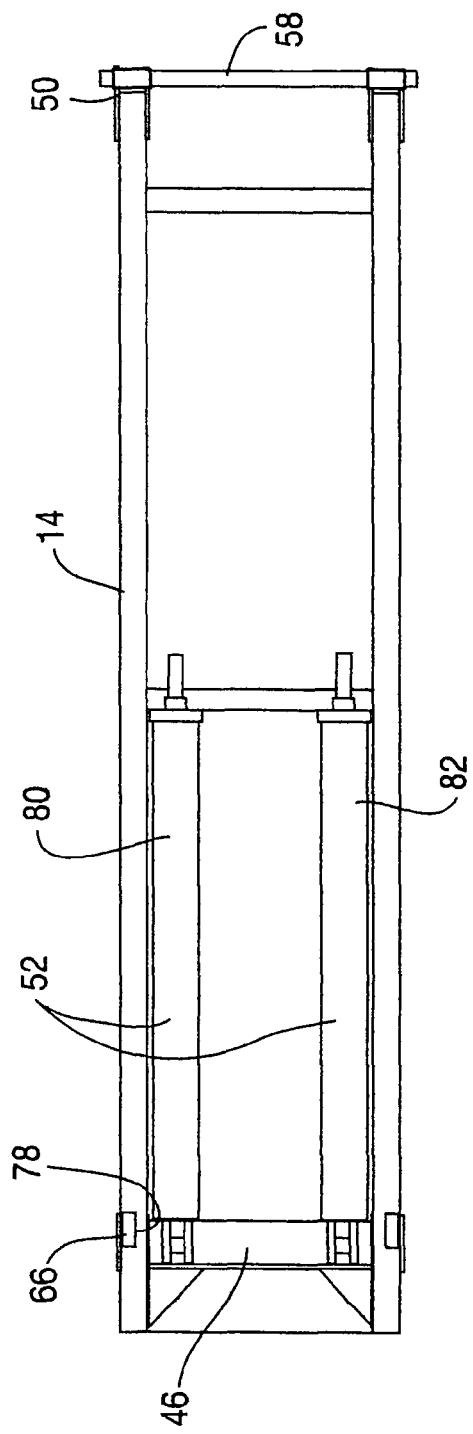
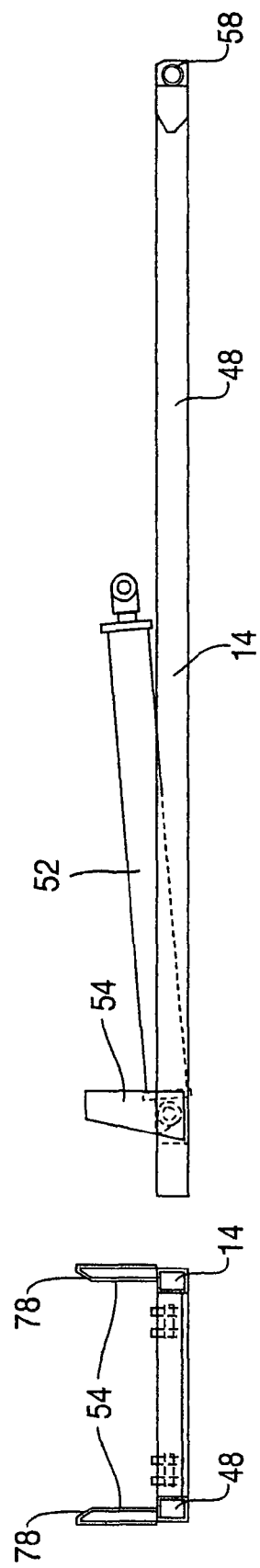
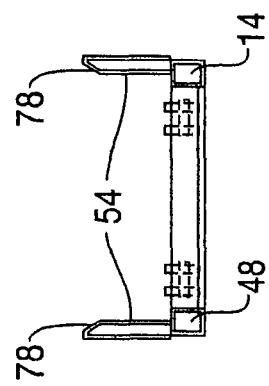
FIG. 3A
FIG. 3C
FIG. 3B

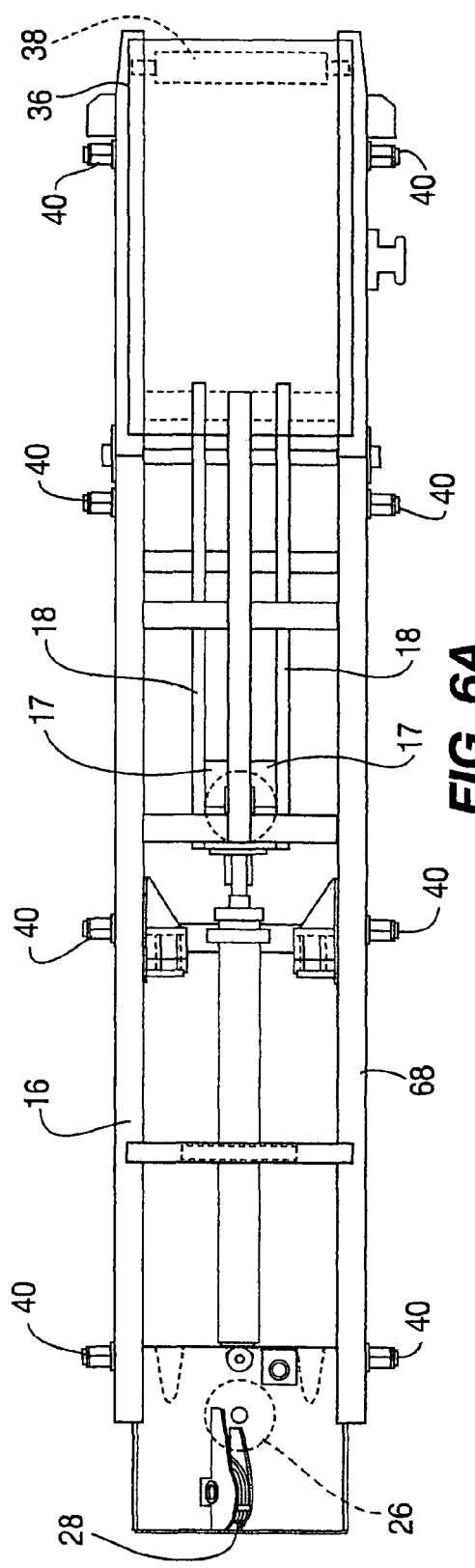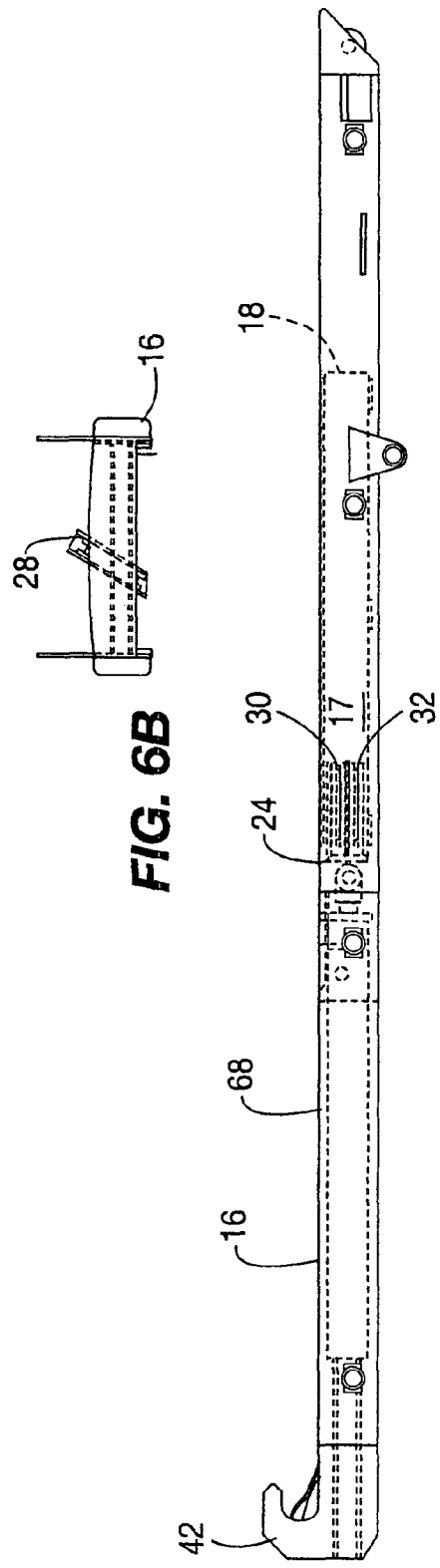
FIG. 6A
FIG. 6B
FIG. 6C

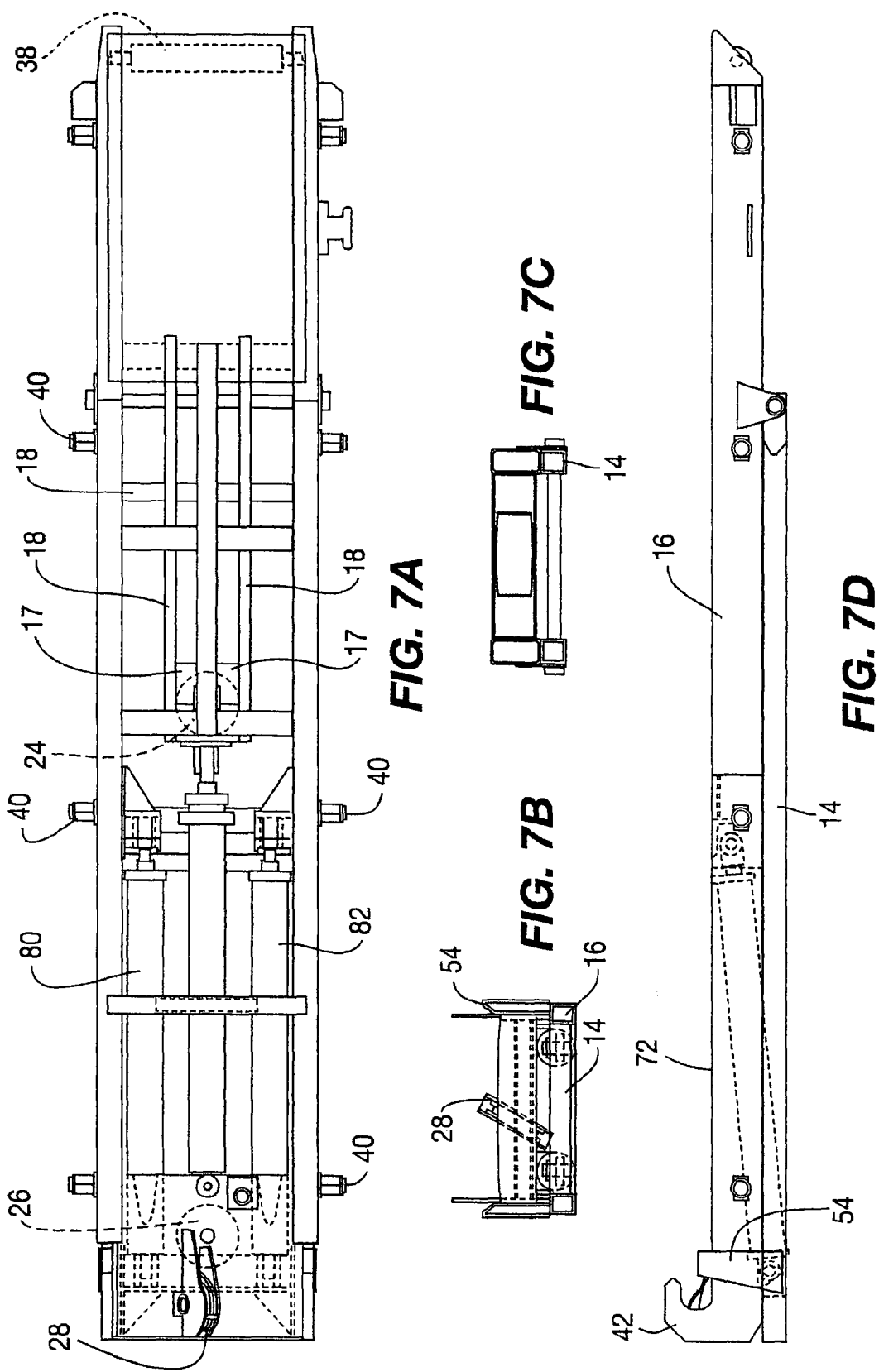

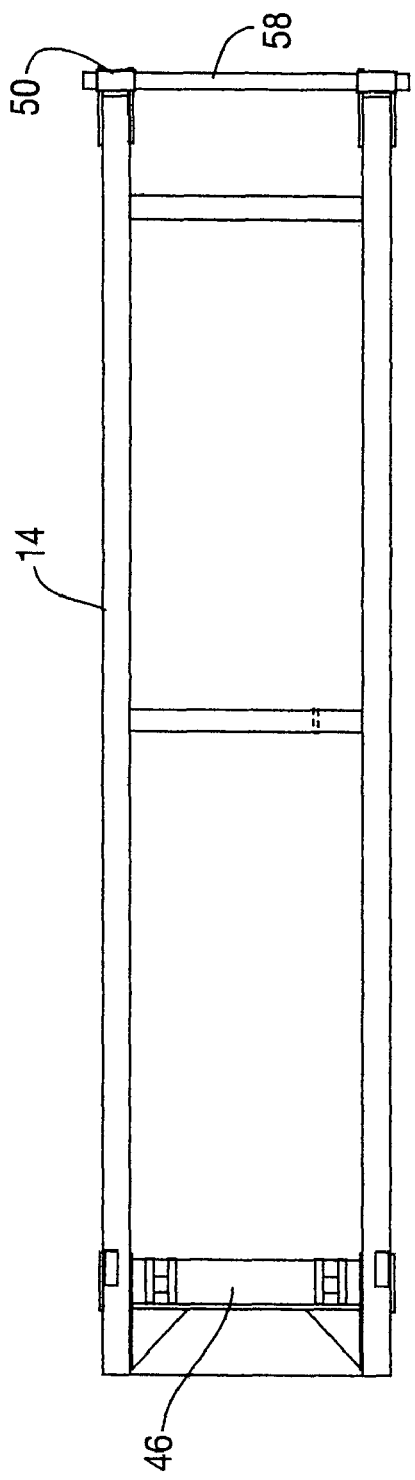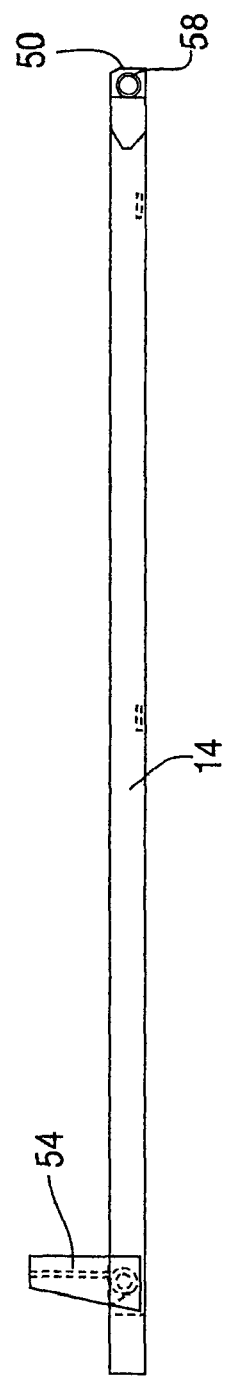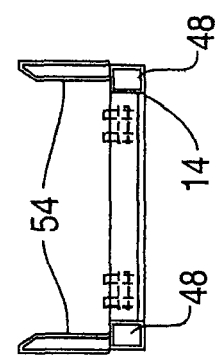
FIG. 8A
FIG. 8C
FIG. 8B

CABLE HOISTING APPARATUS

The present application for a utility patent hereby claims priority of U.S. provisional patent application No. 60/906,121 filed Mar. 9, 2007, on Cable Hoisting Apparatus, currently pending filed by the same inventor as set forth herein and assigned to the same assignee as set forth herein. All priority rights including filing date priority are hereby formally claimed and the entire provisional patent application is hereby incorporated by reference herein for all purposes.

BACKGROUND OF THE INVENTION

1. Field of the Invention

The present invention deals with the field of roll off hoisting apparatus designed to load and unload containers such as waste receptacles with respect to vehicles such as truck bodies or trailer bodies.

The apparatus of the present invention provides a positive engaging and disengaging means for locking of the container with respect to the top frame to facilitate securement thereof in an easy and reliable manner.

2. Description of the Prior Art

Many prior art devices have been patented covering cable powered roll off container loading and unloading apparatus for use with trailers and truck bodies such as shown in U.S. Pat. No. 1,821,327 patented Sep. 1, 1931 to W. P. Scott on an "Automobile Truck"; and U.S. Pat. No. 1,885,399 patented Nov. 1, 1932 to V. T. Wren on a "Freight Loading And Unloading Device For Vehicles"; and U.S. Pat. No. 2,082,663 patented Jun. 1, 1937 to G. P. Slater on a "Sliding Reach And Sleeve For Truck Beds"; and U.S. Pat. No. 2,468,502 patented Apr. 26, 1949 to E. Lisota on an "Actuated Device For Sliding Vehicle Beds"; and U.S. Pat. No. 2,530,350 patented Nov. 14, 1950 to E. R. Ehlert on an "Unloader For Farm Vehicles"; and U.S. Pat. No. 2,588,001 patented Mar. 4, 1952 to J. C. Holland on an "Apparatus For Moving Small Houses And The Like"; and U.S. Pat. No. 2,621,814 patented Dec. 16, 1952 to E. Lisota on an "Adjustable Tilting Bed For Trucks"; and U.S. Pat. No. 2,703,658 patented Mar. 8, 1955 to C. S. Bazzell on a "Vehicle Convoy Or Carrier With Adjustable Ramp"; and U.S. Pat. No. 2,741,383 patented Apr. 10, 1956 to J. T. Leckert on a "Self Unloading Vehicle"; and U.S. Pat. No. 3,001,825 patented Sep. 26, 1961 to W. D. Rouse on a "Tandem Dumping-Platform Truck"; and U.S. Pat. No. 3,049,378 patented Aug. 14, 1962 to F. E. Nelson on a "Self-Loading And Unloading Vehicle"; and U.S. Pat. No. 3,074,574 patented Jan. 22, 1963 to R. Prince on a "Truck Frame And Retractable Truck Bed"; and U.S. Pat. No. 3,077,278 patented Feb. 12, 1963 to H. G. Alexander on a "Truck Loading Assembly With Detachable Container"; and U.S. Pat. No. 3,127,041 patented Mar. 31, 1964 to J. P. Flynn et al on a "Vehicle Load Bed"; and U.S. Pat. No. 3,138,276 patented Jun. 23, 1964 to D. E. Allen et al on a "Demountable Truck Body"; and U.S. Pat. No. 3,144,149 patented Aug. 11, 1964 to G. R. Dempster et al on "Transporting Equipment For Containers"; and U.S. Pat. No. 3,195,749 patented Jul. 20, 1965 to J. S. Dempster et al on a "Container Loading And Unloading Mechanism"; and U.S. Pat. No. 3,214,046 patented Oct. 26, 1965 to G. R. Dempster et al on a "Container Handling Mechanism"; and U.S. Pat. No. 3,231,120 patented Jan. 25, 1966 to G. R. Dempster et al on a "Container Loading And Unloading Mechanism"; and U.S. Pat. No. 3,272,546 patented Sep. 13, 1966 to C. R Cooley on a "Push-Pull Device For Containers"; and U.S. Pat. No. 3,302,808 patented Feb. 7, 1967 to W. A. Herpich et al on a "Container Loading And Unloading Mechanism"; and U.S. Pat. No. 3,399,795 patented Sep. 3, 1968 to R. V. Clucker et al on a "Loading Apparatus For Demountable Vehicle Bodies"; and U.S. Pat. No. 3,467,268 patented Sep. 16, 1969 to A. Corompt on an "Apparatus For Handling And Transport Of Heavy Bulky Containers"; and U.S. Pat. No. 3,485,400 patented Dec. 23, 1969 to C. W. Pewthers on a "Vehicle With Sliding And Tilting Bed"; and U.S. Pat. No. 3,514,000 patented May 26, 1970 to M. C. Kolling et al on "Mobile Trucking Equipment"; and U.S. Pat. No. 3,572,563 patented Mar. 30, 1971 to E. T. Oliver on a "Truck Unloader"; and U.S. Pat. No. 3,606,059 patented Sep. 20, 1971 to H. Haberle, Jr. on a "Roll-Off Trailer"; and U.S. Pat. No. 3,638,808 patented Feb. 1, 1972 to D. M. Grey et al and assigned to Sperry-Rand Corporation on a "Bale Wagon"; and U.S. Pat. No. 3,638,817 patented Feb. 1, 1972 to A. Corompt and assigned to Bennes Marrel on a "Container Handling And Transporting Device"; and U.S. Pat. No. 3,648,868 patented Mar. 14, 1972 to M. M. Richler and assigned to Atlas Hoist & Body Incorporated on a "Container Transporting Vehicle"; and U.S. Pat. No. 3,712,491 patented Jan. 23, 1973 to T. F, Kreutzer and assigned to L.S.T. Enterprises on a "Dual Purpose Dump And Transport Vehicle"; and U.S. Pat. No. 3,819,075 patented Jun. 25, 1974 to C. Derain and assigned to Societe Nouvelle des Bennes Saphem on a "Device For Loading A Skip On To A Vehicle"; and U.S. Pat. No. 3,874,537 patented Apr. 1, 1975 to J. Kou on a "Road Vehicle Of The Platform Type"; and U.S. Pat. No. 3,892,323 patented Jul. 1, 1975 to A. Corompt and assigned to Bennes Marrel on a "Container-Handling Device For A Self-Loading Vehicle"; and U.S. Pat. No. 3,894,644 patented Jul. 15, 1975 to H. G. Alexander on a 'Truck-Mounted Loader"; and U.S. Pat. No. 3,934,740 patented Jan. 27, 1976 to J. A. Rumell on a "Transport Vehicle With Tiltable Chassis"; and U.S. Pat. No. 3,964,626 patented Jun. 22, 1976 to J. L. L. Arregui and assigned to Asteko S/A on a "Truck For Handling Containers"; and U.S. Pat. No. 3,988,035 patented Oct. 26, 1976 to A. Corompt and assigned to Bennes Marrel on a "Locking Device, In Particular For A Handling Cranked Arm Mounted On A Vehicle"; and U.S. Pat. No. 4,058,231 patented Nov. 15, 1977 to H. Visa et al and assigned to Autolava Oy on an "Apparatus For Moving An Exchangeable Platform Or A Container On To And Off Of A Tipping Frame Of A Lorry, Trailer, Or The Like"; and U.S. Pat. No. 4,090,623 patented May 23, 1978 to G. M. Noyon and assigned to Societe Internationale d' Investissements et de Participations par abbreviation Interpar on a "System For Handling A Container"; and U.S. Pat. No. 4,092,755 patented Jun. 6, 1978 to G. W. Hughes on a "Highly Versatile Dock Trailer"; and U.S. Pat. No. 4,109,810 patented Aug. 29, 1978 to E. D. Jones on an "Apparatus For Mounting And Demounting A Vehicle Body"; and U.S. Pat. No. 4,133,439 patented Jan. 9, 1979 to P. I. Goranson and assigned to Carrier Corporation on a "Vehicle Body Loading And Unloading Mechanism"; and U.S. Pat. No. 4,175,904 patented Nov. 27, 1979 to M. Airaksinen and assigned to Multilift Oy on an "Apparatus For Mounting, Demounting, And Tipping Vehicles"; and U.S. Pat. No. 4,225,280 patented Sep. 20, 1980 to R. Brunet et al and assigned to Constructions Navales et Industrielles de la Mediterranee on a "Trailer For Transporting And Launching Floating Box Caissons"; and U.S. Pat. No. 4,344,731 patented Aug. 17, 1982 to H. Visa et al and assigned to Oy Partek A B on "Equipment For Raising An Exchange Platform Or Container To A Horizontal Position Above The Level Of The Transport Position"; and U.S. Pat. No. 4,350,469 patented Sep. 21, 19182 to A. Corompt and assigned to Bennes Marrel S. A. on a "Handling Device Mounted On A Vehicle To Carry Out The Handling Of Loads Such As Skips And Containers"; and U.S. Pat. No. 4,352,625 patented Oct. 5, 1982 to J. Bolderoff on a "Container Handling Apparatus"; and U.S. Pat.

No. 4,409,903 patented Oct. 18, 1983 to T. C. Wilhelmsson et al on a "Transportation Apparatus"; and U.S. Pat. No. 4,453,878 patented Jun. 12, 1984 to T. Paukku and assigned to OY Partelsl A B on a "Lock Device For Loading Equipment"; and U.S. Pat. No. 4,455,118 patented Jun. 19, 1984 to H. W. Scharf and assigned to Dempster Systems Inc. on an "Opposed Cylinder Cable Hoist Mechanism"; and U.S. Pat. No. 4,514,131 patented Apr. 30, 1985 to J. P. Godwin on an "Automatic Self-Locking Roll Back Carrier For A Vehicle"; and U.S. Pat. No. 4,529,349 patented Jul. 16, 1985 to T. A Lutz on a "Roll-Off Hoist"; and U.S. Pat. No. 4,548,541 patented Oct. 22, 1985 to A. Corompt and assigned to Bennes Marrel on a "Method And Apparatus For Unloading A Piece Of Equipment Placed On A Carrying Vehicle"; and U.S. Pat. No. 4,580,805 patented Apr. 8, 1986 to W. A. Bertolini and assigned to Titan, Inc. on an "Extendable Container Chassis For Trucks"; and U.S. Pat. No. 4,599,040 patented Jul. 8, 1986 to R. Rasmussen and assigned to Accurate Industries, Inc. on a "Method For Transporting Containers"; and U.S. Pat. No. 4,645,405 patented Feb. 24, 1987 to A. M. Cambiano on a "Roll-Off Container Handling Mechanism"; and U.S. Pat. No. 4,704,063 patented Nov. 3, 1987 to E. B. Updike, jr. et al on a "Container Loading And Unloading Apparatus"; and U.S. Pat. No. 4,755,097 patented Jul. 5, 1988 to A. Corompt and assigned to Bennes Marrel on a "Device For The Handling And Transfer Of A Load On A Vehicle Such As A Container Or A Tray"; and U.S. Pat. No. 4,762,370 patented Aug. 9, 1988 to A. Corompt et al and assigned to Bennes Marrel on a "Tipping Device To Control The Tipping Of A Body Mounted On A Vehicle"; and U.S. Pat. No. 4,770,592 patented Sep. 13, 1988 to C. M. Winter on a "Transport Truck For Vehicles"; and U.S. Pat. No. 4,802,811 patented Feb. 7, 1989 to D. Nijenhuis and assigned to N.C.H. Hydraulische Systemen BV on an "Apparatus For Loading And Unloading An Interchangeable Container Onto And From A Vehicle"; and U.S. Pat. No. 4,836,735 patented Jun. 6, 1989 to M. J. Dennehy, Jr. et al and assigned to XTRA Corporation on a "Load Positioning Container Chassis"; and U.S. Pat. No. 4,840,532 patented Jun. 20, 1989 to D. E. Galbreath and assigned to Galbreath Incorporated on a "Roll-Off Hoist For Variable Positioning Of Containers"; and U.S. Pat. No. 4,848,619 patented Jul. 18, 1989 to A. Corompt and assigned to Bennes Marrel on a "Device For The Handling Of A Container"; and U.S. Pat. No. 4,889,464 patented Dec. 26, 1989 to F. W. Self and assigned to Translift Systems, Inc. on a "Movable Tipping Frame For Hoist Trucks"; and U.S. Pat. No. 4,934,898 patented Jun. 19, 1990 to D. E. Galbreath and assigned to Galbreath Incorporated on a "Roll-Off Hoist For Variable Positioning Of Containers And Method For Use Thereof"; and U.S. Pat. No. 4,943,203 patented Jul. 24, 1990 to J. Bohata on a "Retriever Truck"; and U.S. Pat. No. 4,954,039 patented Sep. 4, 1990 to W. T. Johnston et al and assigned to Trailstar Mfg. Corp. on a "Uniframe Rolloff Dumpster"; and U.S. Pat. No. 4,986,719 patented Jan. 22, 1991 to D. E. Galbreath and assigned to Galbreath Incorporated on a "Roll-Off Hoist For Variable Positioning Of Containers"; and U.S. Pat. No. 5,007,791 patented Apr. 16, 1991 to T. T. Boughton and assigned to T. T. Boughton & Sons Ltd. on an "ISO Container Handling System"; and U.S. Pat. No. 5,026,228 patented Jun. 25, 1991 to P. M. Mansfield on a "Truck Trailer With Hydraulic Cargo Container Positioning Mechanism"; and U.S. Pat. No. 5,082,416 patented Jan. 21, 1992 to N. Bock and assigned to Edelhoff M. S. T. S GmbH on a "Method Of Picking Up And Depositing A Hollow Receptacle Such As A Bin, Container Or The Like By And On, Respectively, A Vehicle With Change Gear Mechanism; Change Gear Mechanism For Carrying Out The Method; And Receptacle Designed For Use In Such Method"; and U.S. Pat. No. 5,088,875 patented Feb. 18, 1992 to D. E. Galbreath et al and assigned to Galbreath Incorporated on a "Roll-Off Hoist For Variable Positioning Of Containers"; and U.S. Pat. No. 5,163,800 patented Nov. 17, 1992 to R. Raisio and assigned to Multilift Oy on a "Transportation Frame And Equipment Frame For Use With Load Handling System"; and U.S. Pat. No. 5,183,371 patented Feb. 2, 1993 to H. W. O'Daniel on an "Extendable Rolloff Trailer"; and U.S. Pat. No. 5,203,667 patented to T. Yoneda et al on Apr. 20, 1993 and assigned to Kyokuto Kaihatsu Kogyo Co., Ltd. on a "Cargo Truck Which Can Lower The Body To The Ground In A Level Position"; and U.S. Pat. No. 5,203,668 patented Apr. 20, 1993 to L. Marmur and assigned to E. Fisher; L. Marmur; F. Fisher and W. Kimble on an "Apparatus for Loading And Unloading Of A Container Structure Or Other Loads With Respect To A Truck Body Or Trailer"; and U.S. Pat. No. 5,213,466 patented May 25, 1993 to L. Bubik and assigned to Vulcan International, Inc. on a "Multifunction Loading And Recovery Apparatus"; and U.S. Pat. No. 5,246,329 patented Sep. 21, 1993 to R. J. Farrell on a "Multi-Position Flat Bed Truck"; and U.S. Pat. No. 5,246,330 patented Sep. 21, 1993 to L. Marmur et al and assigned to Automated Waste Equipment Co., Inc. on an "Apparatus For Loading And Unloading Of Two Separate Containers Upon A Vehicular Body"; and U.S. Pat. No. 5,324,160 patented Jun. 28, 1994 to B. Smith on a "Tiltable Trailer For Loading, Unloading And Transporting Containers"; and U.S. Pat. No. 5,460,473 patented Oct. 24, 1995 to R. LaMora et al and assigned to Accurate Industries, Inc. on a "Double Container Trailer"; and U.S. Pat. No. 5,509,775 patented Apr. 23, 1996 to D. H. Kendall and assigned to The U.S. of America as represented by the Secretary of the Army on a "Self Loading Cargo Vehicle"; and U.S. Pat. No. 5,529,454 patented Jun. 25, 1996 to S. D. Alm et al on a "Transporting Apparatus And Method"; and U.S. Pat. No. 5,542,807 patented Aug. 6, 1996 to K. Kruzick and assigned to Galbreath Incorporated on a "Vehicle Mounted, Variable Length Hook Hoist"; and U.S. Pat. No. 5,562,391 patented Oct. 8, 1996 to R. Green on a "Modular Unit Loading And Unloading Apparatus"; and U.S. Pat. No. 5,580,211 patented Dec. 3, 1996 to W. F. Mengel on a "Container Transportation System"; and U.S. Pat. No. 5,601,393 patented Feb. 11, 1997 to T. J. Waldschmitt and assigned to Swaokiader U.S.A., Ltd. on a "Dual Capacity Hook-Lift Hoist"; and U.S. Pat. No. 5,660,446 patented Aug. 26, 1997 to E. P. Weatherly on a "Dump Trailer With Multi-Stage Hopper"; and U.S. Pat. No. 5,662,453 patented Sep. 2, 1997 to S. R. Gerstner et al on a "Truck Bed Lift System And Method"; and U.S. Pat. No. 5,678,978 patented Oct. 21, 1997 to G. R. Markham and assigned to Modem, Inc. on an "Apparatus For A Tiltable Rolloff Trailer Having A Displacable Frame"; and U.S. Pat. No. 5,718,554 patented Feb. 17, 1998 to J. R. McElroy and assigned to The McElroy Company, Inc. on a "Truck Trailer With Removable Racks"; and U.S. Pat. No. 5,725,350 patented Mar. 10, 1998 to r. E. Christenson and assigned to McNeilus Truck and Manufacturing, Inc. on a "Detachable Truck Body And Handling Mechanism"; and U.S. Pat. No. 5,779,431 patented Jul. 14, 1998 to S. D. Alm et al and assigned to Vulcan International, Inc. on a "Transporting Apparatus And Method"; and U.S. Pat. No. 5,795,124 patented Aug. 18, 1998 to J. J. Kutten et at and assigned to Jerry J. Kitten on a "Self-Loading Material Hauler And Distributor"; and U.S. Pat. No. 5,807,057 patented Sep. 15, 1998 to D. Nijenhuis and assigned to N.C.H. Hydraulische Systemen B.V on a "Transport Vehicle For Taking Up And Taking Down Containers And The Like Onto Or From A Loading Platform Thereof"; and U.S. Pat. No. 5,813,824 patented Sep. 29, 1998 to J. G. Zanzig et al and assigned to The Heil Company on a "Method Of Collecting Refuse"; and U.S. Pat. No. 5,823,733 patented Oct. 20, 1998 to K. Kruzick on a "Vehicle Mounted Hoist With Adjustable Container Supporting Roller Assemblies"; and U.S. Pat. No. 5,839,864 patented Nov. 24, 1998 to S. K. Reynard on a "Locking System For Container-Carrying Trailer"; and U.S. Pat. No. 5,848,869 patented to A. H. Slocum et al on Dec. 15, 1998 and assigned to AESOP, Inc. on a "Container Restraining Mechanism And Method"; and U.S. Pat. No. 5,871,328 patented Feb. 16, 1999 to D. L. Pinkston on a "Wrecker Truck With Sliding Deck"; and U.S. Pat. No. 5,913,561 patented Jun. 22, 1999 to J. W. Alcorn on a "Top Cover "Tarpping" System For Roll-Off Container Trucks"; and U.S. Pat. No. 5,921,742 patented Jul. 13, 1999 to B. O. Gearhart and assigned to Benlee, Inc. on an "Articulating Roll-Off Trailer"; and U.S. Pat. No. 5,951,235 patented to C. E. Young et al on Sep. 14, 1999 to Jerr-Dan Corporation on an "Advanced Rollback Wheel-Lift"; and U.S. Pat. No. 5,967,733 patented Oct. 19, 1999 to R. Cash and assigned to Cash Brothers Leasing, Inc. on a "Hydraulic Tilt Trailer"; and U.S. Pat. No. 5,996,171 patented Dec. 7, 1999 to R. Bowers on a "Vacuum Truck System"; and U.S. Pat. No. 6,053,692 patented Apr. 25, 2000 to T. M. Mason et al on a "Device For Securing A Removable Container To A Hauling Vehicle"; and U.S. Pat. No. 6,068,440 patented May 30, 2000 to A. M. Lang et al and assigned to Marathon Equipment Company on a "Locking Mechanism For Roll-Off Hoist"; and U.S. Pat. No. 6,168,371 patented Jan. 2, 2001 to J. R. Lesmeister et al and assigned to Raymond Keith Foster on a "Method Of Loading A Container"; and U.S. Pat. No. 6,276,890 patented Aug. 21, 2001 to T. A. Pratt and assigned to Miller Industries Towing Equipment, Inc. on a "Carrier With Articulable Bed"; and U.S. Pat. No. 6,332,746 patented Dec. 25, 2001 to A. M. Lang et al and assigned to Delaware Capital Formation, Inc. on a "Locking Mechanism For Roll-Off Hoist"; and U.S. Pat. No. 6,336,783 patented to C. E. Young et al on Jan. 8, 2002 and assigned to Jerr-Dan Corporation on an "Advanced Rollback Wheel-Lift"; and U.S. Pat. No. 6,354,787 patented to H. W. O'Daniel on Mar. 12, 2002 to G & H Manufacturing Ltd. on a "Double Container Trailer Apparatus And Method Of Use"; and U.S. Pat. No. 6,390,761 patented May 21, 2002 to J. M. Palmer, Jr. et al on a "Telescopic Ramp"; and U.S. Pat. No. 6,394,734 patented May 28, 2002 to D. R. Landoll et al on a "Trailer Having Actuatable Tail Ramp"; and U.S. Pat. No. 6,406,231 patented Jun. 18, 2002 to D. R. Landoll et al and assigned to Landoll Corporation on a "Container Lockdown Device"; and U.S. Pat. No. 6,406,247 patented Jun. 18, 2002 to A. Ghiretti et al and assigned to Palfinger A G on an "Apparatus For Loading And Unloading A Container On To And Off A Vehicle"; and U.S. Pat. No. 6,419,292 patented Jul. 16, 2002 to B. G. Calcote et al on a "Truck Bed Conversion"; and U.S. Pat. No. 6,431,577 patented Aug. 13, 2002 to J. L. Chapman on a "Trailer Hitch Support Body"; and U.S. Pat. No. 6,461,096 patented Oct. 8, 2002 to C. R. Mentele et al and assigned to Trail King Industries, Inc. on a "Tilt Bed For Loading And Transporting A Load"; and U.S. Pat. No. 6,511,278 patented Jan. 28, 2003 to M. W. Harkcom et al and assigned to New Holland North America, Inc. on an "Apparatus For Securing An Implement To A Transporter"; and U.S. Pat. No. 6,537,015 patented Mar. 25, 2003 to D. W. Lim et al and assigned to Kosman Co., Ltd. on a "Container Loading And Unloading Apparatus"; and U.S. Pat. No. 6,547,506 patented Apr. 15, 2003 to A. K. Jacob on a "Multi-Task Truck"; and U.S. Pat. No. 6,558,104 patented May 6, 2003 to J. A. Vlaanderen et al and assigned to Stellar Industries, Inc. on a "Container Handling System For A Vehicle"; and U.S. Pat. No. 6,568,892 patented May 27, 2003 to D. R. Landoll et al and assigned to Landoll Corporation on a "Container Lockdown Device"; and U.S. Pat. No. 6,589,005 patented Jul. 8, 2003 to C. Hull and assigned to H & H Trailer Company, Inc. on a "Tilt Bed Trailer"; and U.S. Pat. No. 6,962,473 patented Nov. 8, 2005 to T. L. Scranton et al and assigned to Columbia Body Manufacturing Co. on an "Apparatus For Transferring Containers And Flat Racks From A Truck To A Trailer".

SUMMARY OF THE INVENTION

The present invention defines a unique apparatus to facilitate the hoisting of containers onto transportation vehicles. Such containers are commonly waste receptacles which can be mounted upon a chassis or frame of a truck or trailer to facilitate transport after emptying or filling thereof as may be needed. Such containers can be extremely heavy and require a reliable and powerful means for facilitating loading and unloading thereof with respect to the transportation vehicle.

The apparatus of the present invention is modular since the entire hoisting apparatus is attachable as a unit to the frame of the transportation vehicle. This hoisting apparatus includes a subframe directly securable to the vehicle with a top frame pivotally movable relative to the subframe. A single reeve cylinder is mounted within the lateral tubing of the frame rails for powering movement of a cable which is attachable to the container for facilitating loading and unloading thereof. Also a lifting cylinder means is mounted within the subframe tubes for powering the pivotal movement of the top frame upwardly to an inclined position relative to the subframe about a pivot axis common to both frames in such a manner as to facilitate loading of the container upon the obliquely and angularly positioned top frame.

The apparatus of the present invention includes a shoe member designed to slide along a shoe track to facilitate movement of the loading cable and, particularly, to power movement of the loading cable for drawing of a container which might be filled and thus be very heavy onto the position on the top frame. The top frame is pivotally mounted with respect to the subframe about an axis defined at the rear portion of the subframe and at an intermediate position on the top frame.

The top frame preferably includes a front hook means which is adapted to engage the laterally extending container front roller to facilitate firm and reliable locking of the container in position retained upon the top frame. The subframe also includes a locking strut extending outwardly therefrom and adapted to be positionable immediately adjacent the front hook means to define a locking means therewithin for preventing movement of the container by at least partially encircling a laterally extending member on the container such as a front roller thereof. This locking mechanism is designed to automatically lock a container whenever it is fully positioned upon the vehicle and ready to be transported thereby.

Thus, with the apparatus of the present invention, the hoisting apparatus and subframe can be pre-assembled prior to initial installation and can be directly secured to the frame of the vehicle. A pivotally moveable top frame is attached only to the subframe and not to the frame of the vehicle. The advantage of this apparatus includes the mounting of, preferably, a single reeve cylinder as well as the lifting cylinders all at a position within the lateral side rails of the frames to provide a self-contained modular apparatus to facilitate initial installation as well as maintenance thereof.

It is an object of the present invention to provide a cable hoisting apparatus which is modular and can be easily mounted on top of the frame of a vehicle such as a truck body or trailer body at initial installation after being assembled prior to placement.

It is an object of the present invention to provide a cable hoisting apparatus which can be easily removed completely from a transportation vehicle to facilitate maintenance thereof at a remote location.

It is an object of the present invention to provide a cable hoisting apparatus that can be constructed with a single reeve cylinder means and a dual lifting cylinder means positioned on top of the vehicle frame mounted at a position between the lateral rails of the subframe and/or top frame thereof.

It is an object of the present invention to provide a cable hoisting apparatus which includes a positively engaging and disengaging lock means for firmly and reliably securing a container to the top frame.

It is an object of the present invention to provide a cable hoisting apparatus which includes a subframe fixedly secured to the vehicle body and a top frame pivotally mounted with respect to the subframe to facilitate loading and unloading of a container in position on the top frame.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which:

FIG. 1A is a top plan view of an embodiment of the cable hoisting apparatus of the present invention;

FIG. 1B is an end plan view of an embodiment of the cable hoisting apparatus of the present invention;

FIG. 1C is a side plan view of an embodiment of the cable hoisting apparatus of the present invention;

FIG. 2A is a top plan view of an embodiment of a top frame of the present invention;

FIG. 2B is an end plan view of an embodiment of the top frame of the present invention;

FIG. 2C is a side plan view of an embodiment of the top frame of the present invention;

FIG. 3A is a top plan view of an embodiment of a sub frame of the present invention;

FIG. 3B is an end plan view of an embodiment of a subframe of the present invention;

FIG. 3C is a side plan view of an embodiment of a subframe of the present invention;

FIG. 6A is a top plan view of an embodiment of the top frame of the cable hoisting apparatus of the present invention;

FIG. 6B is an end plan view of an embodiment of the top frame of the cable hoisting apparatus of the present invention;

FIG. 6C is a side plan view of an embodiment of the top frame of the cable hoisting apparatus of the present invention;

FIG. 7A is a top plan view of an embodiment of the fully engaged top frame and subframe assembly of the cable hoisting apparatus of the present invention;

FIGS. 7B and 7C are two opposite end plan views of an embodiment of the fully engaged top frame and subframe assembly of the hoisting apparatus of the present invention;

FIG. 7D is a side plan view of an embodiment of the fully engaged top frame and subframe assembly of the hoisting apparatus of the present invention;

FIG. 8A is a top plan view of an embodiment of the subframe of the present invention;

FIG. 8B is an end plan view of an embodiment of the subframe of the present invention;

FIG. 8C is a side plan view of an embodiment of the subframe of the present invention;

DETAILED DESCRIPTION OF THE PREFERRED EMBODIMENT

Figure 4A:
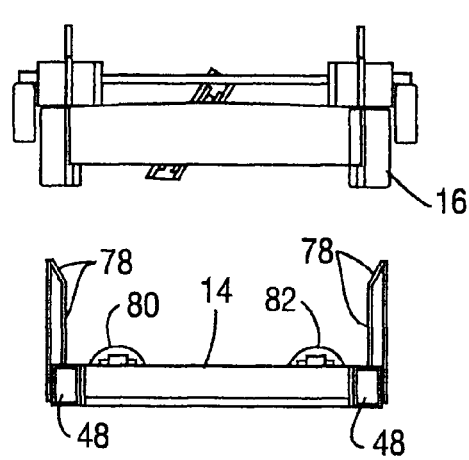
FIGS. 4A, 4B and 4C show an end plan view of an embodiment of the top frame and subframe of the hoisting apparatus of the present invention shown in the disengaged position, partial engaged position and fully engaged position, respectively.
Figure 5A:
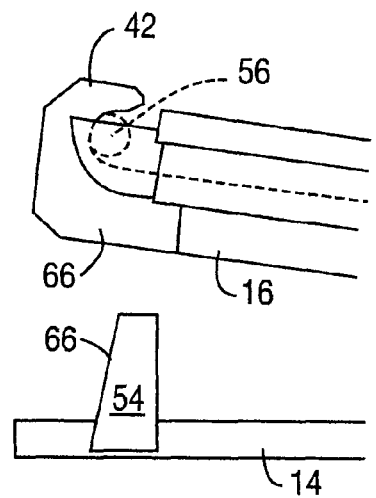
FIGS. 5A, 5B and 5C show a side plan view of an embodiment of the top frame and subframe of the cable hoisting apparatus of the present invention shown in the disengaged position, partial engaged position and fully engaged position, respectively.
Figure 4B:
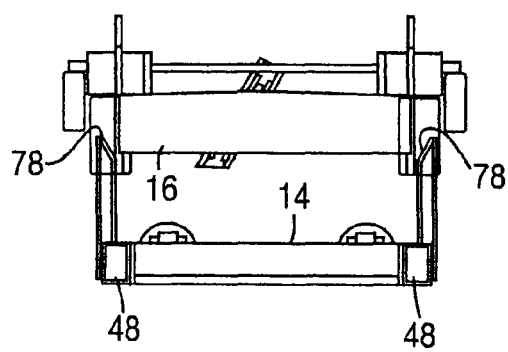
Figure 5B:
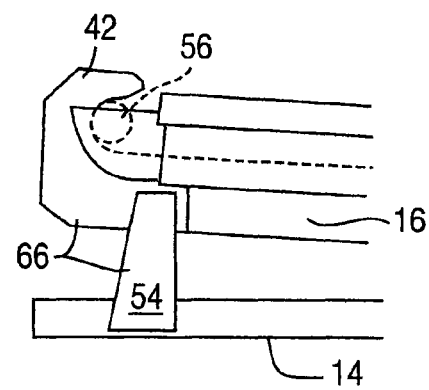
Figure 4C:
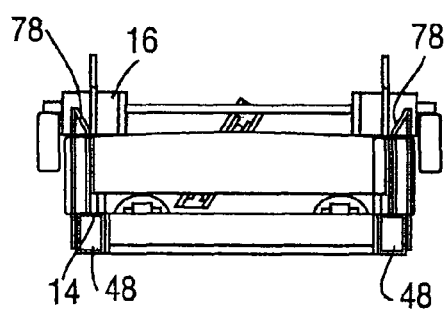
Figure 5C:
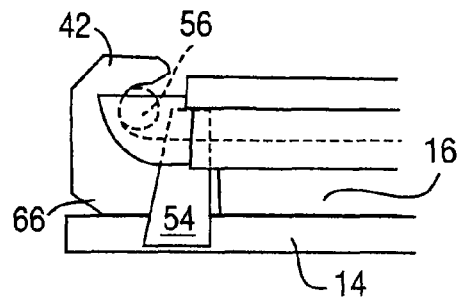
Figure 9:
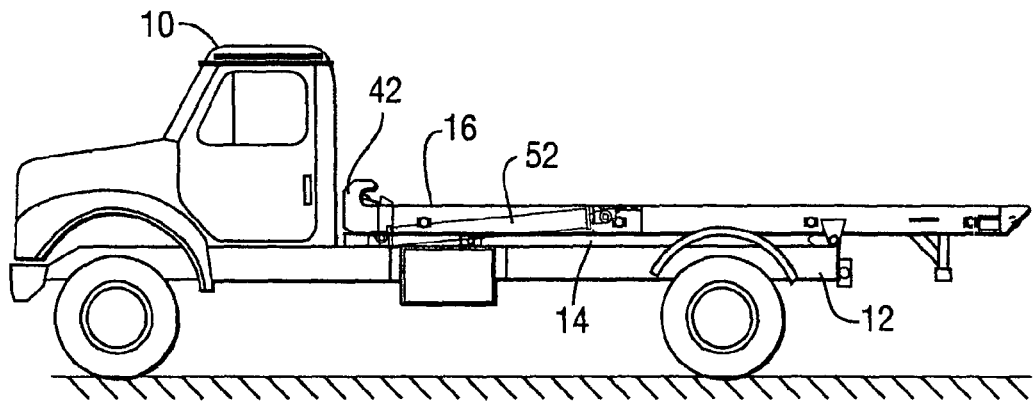
FIG. 9 is an illustration of a transportation vehicle, namely, a truck showing an apparatus of the cable hoisting apparatus of the present invention shown secured thereto.
Figure 10:
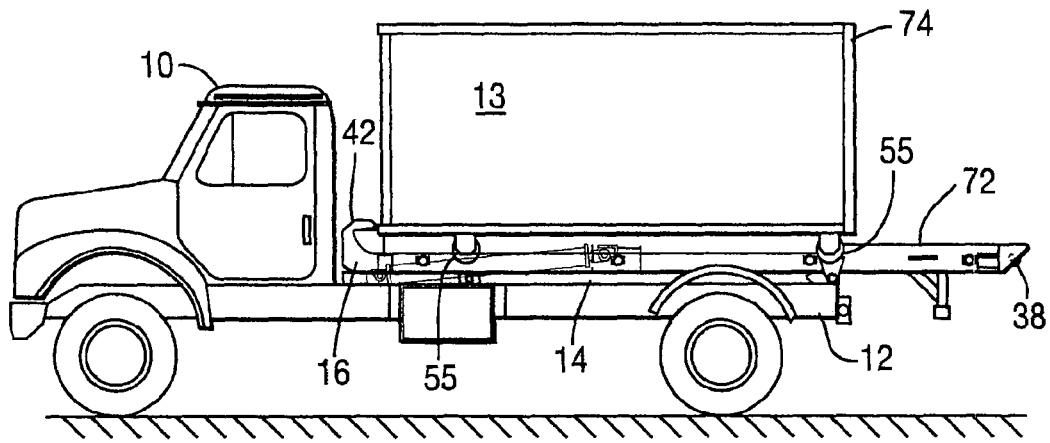
FIG. 10 is a side plan view of an embodiment of a transportation truck with an embodiment of the hoisting apparatus attached thereto and a 12 foot container shown positioned thereon.
Figure 11:
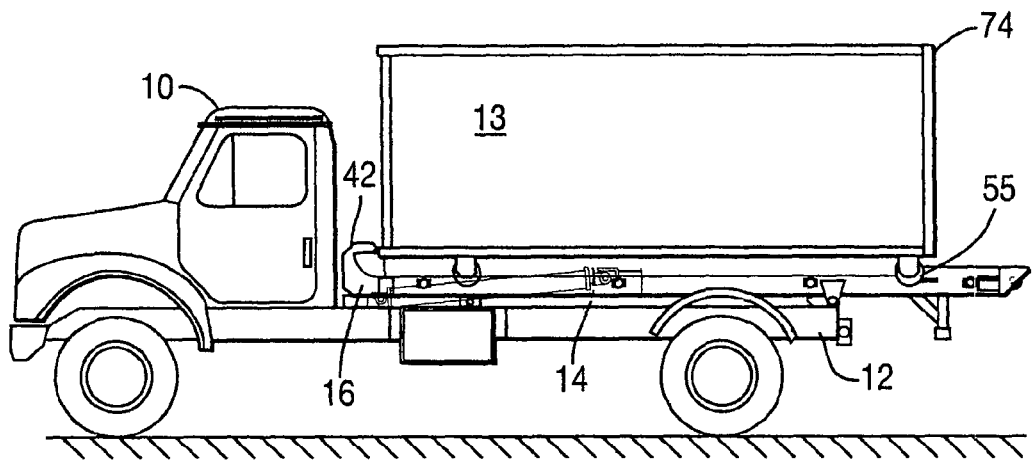
FIG. 11 is a side plan view of an embodiment of a transportation truck with an embodiment of the hoisting apparatus attached thereto and a 14 foot container shown positioned thereon.
Figure 12:
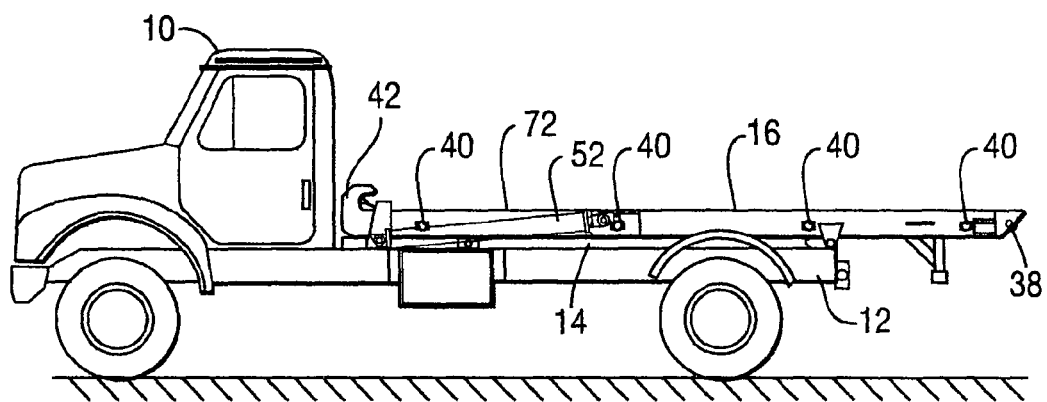
FIG. 12 is a side plan view of a transportation truck showing an embodiment of the cable hoisting apparatus positioned thereupon with both frames in the horizontally fully engaged orientation.
Figure 13:
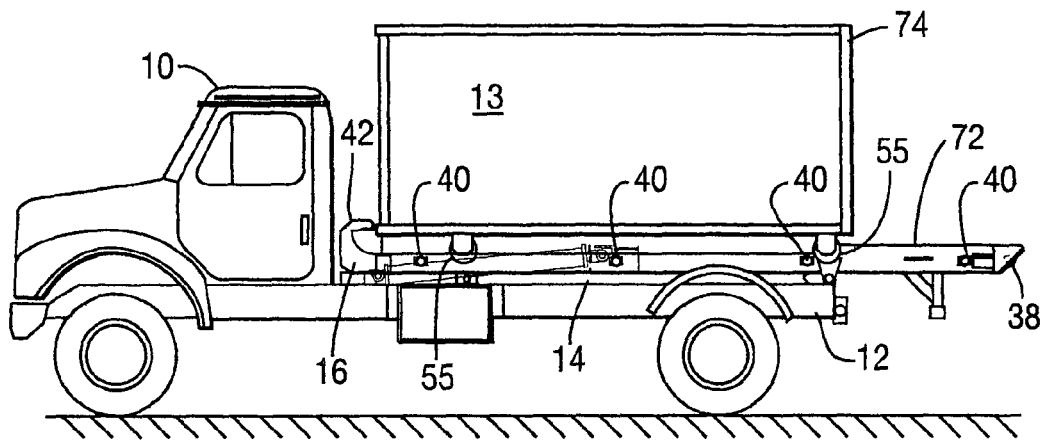
FIG. 13 is an illustration of the embodiment shown in FIG. 12 with a container-shown positioned thereupon.

The cable hoisting apparatus of the present invention provides a modular unit which can be attached with respect to the frame 12 of a roll off truck body 10 or a similarly configured roll off trailer. The apparatus facilitates the loading and unloading of containers 13 such as trash or waste receptacles between the surrounding environmental ground surface and the support surface of the vehicle to facilitate transport thereof.

The construction of the cable hoisting apparatus includes a subframe 14 designed to be attached directly to the frame 12 of the body 10. A top frame 16 is pivotally attached with respect to the subframe 14. Top frame 16 defines an upper support surface thereon adapted to receive a container 13 resting thereupon in the loaded position 74. Thus, with the subframe 14 fixedly secured to the truck body 10 by any conventional means such as by bolts or the like to the frame 12, the top frame 16 is free to move pivotally upwardly with respect thereto in a conventional manner as commonly utilized in roll-off type apparatus to a listed position 70 or can be moveable downwardly to the lowered position 72. In the lowered position said top frame 16 is adapted to receive a container 13 positioned thereon in the loaded position 74. When the top frame 16 is in the lifted position it is positioned to facilitate movement of a container 13 to an unloaded position 76 and from an unloaded position 76. The top frame 16 preferably includes a top frame hinge assembly 44 and the subframe 14 preferably includes a subframe hinge assembly 50 which are adapted to engage one another to provide the capability of pivotal movement of the top frame 16 with respect to the subframe 14 between the horizontal or transporting position and the upwardly inclined loading and/or unloading position.

The top frame preferably includes a slidably movable shoe 17 mounted within a shoe track 18 defined therewithin. The shoe track 18 allows the shoe 17 to be powered to move longitudinally along the top frame 16. The powering of movement of the shoe 17 within the shoe track 18 is preferably provided by a reeve cylinder means 19.

A cable 20 is preferably mounted at a fixed point to the top frame 16 and extends about a plurality of sheaves, at least one of which is rotatably movably mounted to the moveable shoe, and is ultimately connected to the container 13 at a container cable end 21 thereof. The cable 20 can extend through a plurality of cable guides 22 defined in the cross frame members or other portions of the top frame 16. These cable guides 22 help guide the cable to the proper positions extending around the sheaves which are movably attached to the frame and ultimately facilitating attachment of the cable to the container for powering movement thereof on and off of the vehicle.

A shoe sheave 24 is rotatably secured to the shoe 17 to receive the cable extending therearound as shown best in FIG. 2A. A lower front sheave 26 is also shown in FIG. 2A horizontally oriented in position below the top frame front section 34. An upper front sheave 28 is positioned extending obliquely angularly and slightly upwardly as shown at the leftmost portion of FIG. 2A and is also designed to have the cable 22 extend therearound.

Preferably the configuration of the shoe sheave 24 is such that it includes a first or upper shoe sheave groove 30 and a separate second or lower shoe sheave groove 32 both extending peripherally therearound as shown best in FIG. 2C.

The path of travel of the cable 20 in this preferred embodiment is an example only and is certainly not the only way the cable could be routed. However, in this embodiment, the cable is initially secured to the frame at a cable frame securement location 60. This is a fixed securement preferably of one end of the cable. The cable then extends rearwardly to a position extending around the second or lower shoe sheave groove 32 of the shoe sheave 24. The cable extends around this lower shoe sheave groove 32 completely and then extends forwardly toward the lower front sheave 26. The cable runs around lower front sheave 26 and then returns rearwardly to wrap around the upper shoe sheave groove 30 of shoe sheave 24. Thereafter the cable extends again forwardly to the lower end of the obliquely oriented or angularly positioned upper front sheave 28 and extends around front sheave 28 to exit thereabove and then extends directly to the container 13 where the container cable end 21 is fixedly secured directly to the container itself With this configuration it should be appreciated that a great deal of leveraged force can be exerted upon the container to facilitate urging thereof onto the transporting position above the top frame even in those situations where the container 13 is fully loaded and therefore is very heavy.

The powering of movement of the container 13 onto the transporting position above the top frame 16 is provided by activating of the reeve cylinder 19 and particularly in this embodiment by extension outwardly thereof Extending of the reeve cylinder 19 will cause the shoe 17 to move to the right as shown in FIG. 2 A thereby extending the overall total path length of the loading cable 20 and, in this manner, pulling the container onto the top frame to facilitate transport thereof. This pulling of the container is achieved because the opposite end of the container is firmly secured with respect to the top frame at cable frame securement location 60. Thus, the lateral movement of the shoe 17 to the right is shown in FIG. 2A will have the effect of extending the path of the fixed length cable thereby drawing the container 13 onto the fully loaded position above the top frame 16.

Figure 14A:
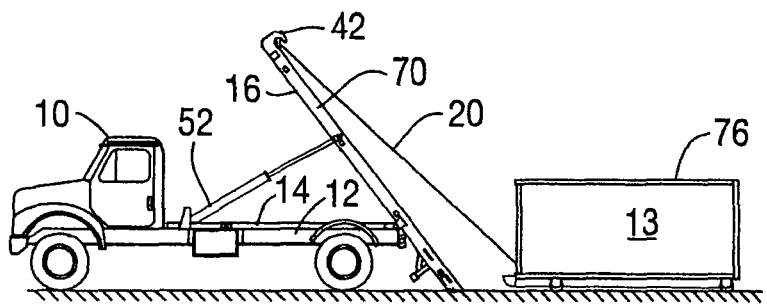
FIG. 14A is an illustration of a truck with an embodiment of the cable hoisting apparatus of the present invention positioned thereon shown with a container in the fully unloaded position but attached to a cable.
Figure 14B:
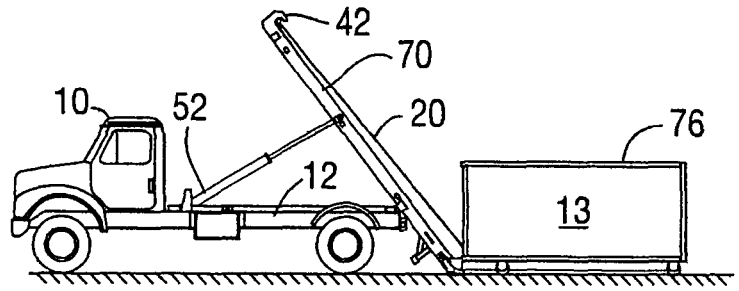
FIG. 14B is an illustration of a truck with an embodiment of the cable hoisting apparatus of the present invention positioned thereon shown with the container attached to a cable and positioned immediately adjacent to the top frame to initiate loading thereof.
Figure 14C:
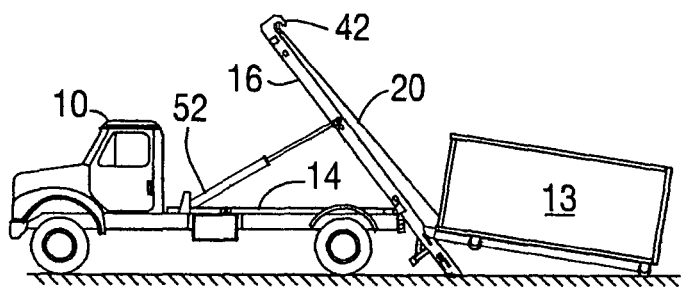
FIG. 14C is an illustration of a truck with an embodiment of the cable hoisting apparatus of the present invention positioned thereon shown with the container in the initial stages of loading upon the top frame.
Figure 14D:
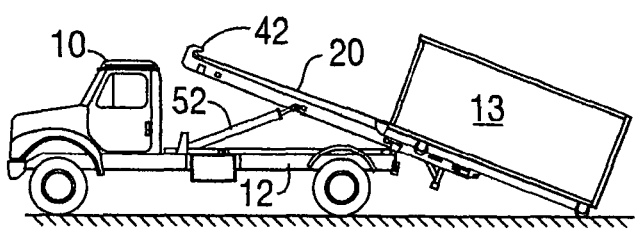
FIG. 14D is an illustration of a truck with an embodiment of the cable hoisting apparatus of the present invention positioned thereon shown with the container shown partially loaded upon the top frame.
Figure 14E:
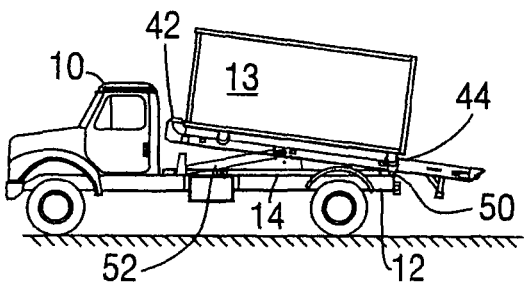
FIG. 14E is an illustration of a truck with an embodiment of the cable hoisting apparatus of the present invention positioned thereon shown with the container positioned on the top frame and with the top frame moving downwardly toward engagement with the subframe.
Figure 14F:
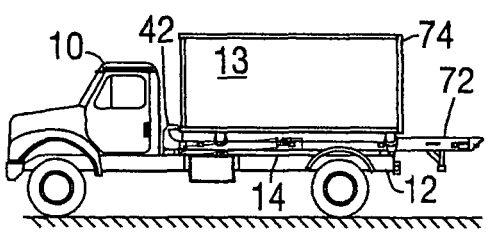
FIG. 14F is an illustration of a truck with an embodiment of the hoisting apparatus of the present invention positioned thereon shown with the container fully positioned on the top frame and with the top frame fully engaged with the subframe.

The overall construction of the top frame 16 includes the top frame front section 34 and the top frame rear section 36. Rear section 36 will preferably include a rear roller 38 which facilitates the proper positioning of the top frame when it is in the inclined loading or unloading position as shown in FIG. 14A because it will allow the lowermost portion of top frame 16 to come in contact with the adjacent ground areas with the rear roller 38 in direct contact therewith and therefore facilitating adjustment and moving thereof as necessary to facilitate container loading.

As the container is pulled upwardly as shown in the progression from FIGS. 14A through 14F, the container 13 will ride upon a plurality of side rollers 40 defined along the outermost edges of top frame 16.

Once the container 13 is in the fully loaded position the front roller 56 of container 13 will become engaged within the front hook 16 included in the top frame front section 34. Front hook 16 preferably is a C-shaped hook means to facilitate holding of the front wheel means of the container. This front hook 16 will lock the front end of the container 13 preventing movement forwardly or upwardly or downwardly thereby facilitating holding of the container 13 in position upon the top frame and prevent movement thereof during transport. The subframe 14 will include a locking strut 54 also referred to herein as a hoist guide and container lock member 14. This locking strut 54 is positionable adjacent to the front hook 16 of the top frame front section 34 to define a retaining zone 62 therebetween adapted to receive a container front roller 56 or other lateral container member 64 therewithin for holding the container 13 in position on the vehicle during transport. The locking strut 54 prevent movement of the container in the rearward direction and the front hook 16 prevents movement of the container in the forward or up or down relative to the support surface. The locking strut 54 and the front hook 16 together define a container locking means 66 which is unique in overall design and automatically operational whenever the container moves to the loaded position 74. Locking strut 54 also defines a guide surface 78 thereon oriented inclined facing upwardly from the sub frame 14. Such guide surfaces 78 facilitating guiding of movement the top frame downwardly into proper alignment with the sub frame 14 responsive to movement of the top frame 16 to the lowered position.

The subframe 14 will preferably include a saddle 42 to further facilitate receiving of the top frame front section 34 immediately thereabove. This subframe will also provide a point of mounting of the pivotally movable lifting means 52 such as a cylinder or the like with respect thereto. Such lifting cylinders 52 are connected at the opposite end thereof with respect to an intermediate position along the top frame 16 to facilitate pivotal movement of top frame 16 with respect to the subframe 14 to facilitate movement of the top frame 16 to the loading and/or unloading position inclined upwardly relative to the truck frame 12. Preferably a first lifting cylinder 80 and a second lifting cylinder 82 will be included to assure sufficient strength to lift the top frame 16 especially when a heavily loaded container is positioned thereupon and ready for unloading. The overall construction of the subframe 14 will preferably include a plurality of subframe tubing members 48 which can define therebetween the lifting cylinders 52 as well as the pivotal mounting locations thereof. Also subframe 14 will include hoist guides and container locks 54 positioned laterally on opposite sides of the location where the container 13 will be positioned for transport to facilitate lateral movement thereof relative to the truck body 10. The containers 13 will preferably include a plurality of wheels 55 to facilitate movement thereof when positioned on the ground or other environmental structure.

The subframe hinge assembly 50 of subframe 14 will preferably include a subframe hinge shaft 58 about which the top frame 16 is movable pivotally to facilitate movement there to the inclined position for aiding during loading and unloading.

One of the important aspects of the present invention is in the modular concept where the subframe has all portions of the cable hoisting apparatus secured with respect thereto such that the subframe itself can be detached from the vehicle to facilitate maintenance or replacement of the hoisting apparatus if necessary. It also allows the hoisting apparatus to be pre-assembled and then attached to a truck merely by attaching of the subframe itself to the frame of the vehicle as a modular unit. This modular construction is made possible because the lifting cylinders 52 are secured at one end to the subframe and at the opposite end to the top frame and in this manner are not directly secured with respect to the vehicle. In prior art constructions these lifting cylinders 52 were mounted movably with respect to the truck frame directly whereas in the present invention they are mounted with respect to a subframe which itself is attachable to the truck frame thereby providing the advantages of a modularized cable hoisting apparatus construction.

Also one of the distinct advantages of the present invention is that the movement of the container 13 into the transporting position will automatically cause the container front roller 56 or other lateral container member 64 to engage the front hook 42 of the top frame 16 and in this manner be automatically locked in position at the front end thereof. That is, no separate locking movement or operation either manual or powered is needed in order to lock the front end of the container 13 relative to the roll off truck frame 12 of the truck body 10. This locking mechanism works well as long as some type of lateral container member 64 is included in the construction of the container 13 which can be captured within the retaining zone 62. Preferably the container front roller 56 will provide the lateral container member 64 which is so captured within retaining zone 62 for container locking. Further preferably two such lateral container members 64 will be included in each container 13 thereby facilitating locking thereof in place within a retaining zone defined on each opposite side of the front of the container 13 by left and right front hooks 42 and by corresponding left and right locking struts 54.

One of the primary advantages of the present invention is the modular design created by the combination of the subframe assembly and the top frame assembly. Positioned of all elements of the present invention to the subframe or to the top frame provides the novel modular construction. As such, full operational placement of this apparatus is achieved solely by attaching of the subframe to the frame of the vehicle. The reeve cylinder means and the lifting cylinder means are positioned between the rails of the subframe and the rail of the top frame and are not directly attached to the vehicle frame in any manner whatsoever. This construction greatly facilitates installation and maintenance of this apparatus.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. An apparatus for loading and unloading of a container, having a front roller means, upon a roll-off vehicle having a frame comprising:
    a) a subframe means attachable fixedly directly to the frame of the roll-off vehicle;
    b) a top frame means pivotally movably secured to said subframe means and defining an upper support surface for receiving of a container positioned thereupon;
    c) a lifting means attached to said subframe means and said top frame means and being operative to move said top frame means between an lifted position vertically inclined with respect to said subframe means to facilitate loading and unloading of containers and a lowered position to facilitate transport of a container selectively attached with respect to the roll-off vehicle;
    d) a container movement control means secured to said top frame means and attachable with respect to a container to facilitate moving of a container onto said upper support surface of said top frame means in a loaded position and to facilitate removing of a container from said upper support surface of said top frame means to an unloaded position; and
    e) a container locking means for detachably securing a container with respect to said top frame means responsive to positioning of the container in the loaded position, the locking means adapted to engage the front roller means of the container to facilitate securing of the container with respect to said top frame means responsive to positioning of the container in the loaded position, said container locking means including:
        1) a front hook means fixedly secured to said top frame means and adapted to engage the front roller means of a container for selective locking thereof with respect to said top frame means responsive to positioning of the container in the loaded position; and
        2) a locking strut means secured to said subframe means and extending outwardly therefrom to a position generally adjacent said front hook means to prevent disengagement of the front roller means of a container from engagement with said front hook means responsive to positioning of a container in the loaded position, the locking strut means comprising a pair of locking struts having planar guide surfaces.

2. An apparatus for loading and unloading of a container, having a front roller means, upon a roll-off vehicle as defined in claim 1 wherein said front hook means includes a C-shaped hook means facing rearwardly along said top frame means, said C-shaped hook means adapted to receive the front roller means of the container positioned therewithin for selectively locking the container in the loaded position.

3. An apparatus for loading and unloading of a container, having a front roller means, upon a roll-off vehicle as defined in claim 2 wherein said locking strut means is positioned extending upwardly adjacent and across said C-shaped hook means to define therebetween a retaining zone means adapted to receive and hold the front roller means of a container therewithin responsive to positioning of a container in the loaded position.

4. An apparatus for loading and unloading of a container, having a front roller means, upon a roll-off vehicle as defined in claim 1 wherein said locking strut means includes a guide surface extending outwardly away from said subframe means toward the position of said top frame means when located in said lifted position thereof to facilitating guiding of movement of said top frame means from said lifted position to said lowered position while maintaining proper alignment between said top frame means and said subframe means.

5. An apparatus for loading and unloading of a container, having a front roller means, upon a roll-off vehicle as defined in claim 1 wherein said front hook means extends upwardly from said top frame means and wherein said locking strut means extends upwardly from said subframe means immediately adjacent to said front hook means to define selectively therebetween a retaining zone means which retains the front roller means of the container therewithin responsive to positioning of the container in the loaded position and is responsive to movement of the container toward the unloaded position to release the front roller means of a container therefrom to facilitate container unloading.

6. An apparatus for loading and unloading of a container, having a front roller means, upon a roll-off vehicle as defined in claim 1 wherein said front hook means selectively locks the front roller means of a container therewithin to prevent movement up, down or longitudinally forwardly along the roll-off vehicle and wherein said locking strut means selectively locks the front roller means of a container thereadjacent to prevent movement longitudinally rearwardly along the roll-off vehicle.

7. An apparatus for loading and unloading of a container, having a front roller means, upon a roll-off vehicle as defined in claim 1 wherein said lifting means comprises at least one lifting cylinder means attached to said subframe means and to said top frame means and being operative to be selectively extensible and retractable, said lifting cylinder means being operative when extended to move said top frame means upwardly toward said lifted position thereof and being operative responsive to retracting thereof to move said top frame means downwardly toward said lowered position.

8. An apparatus for loading and unloading of a container, having a front roller means, upon a roll-off vehicle as defined in claim 7 wherein said lifting cylinder means comprises a first lifting cylinder and a second lifting cylinder extending generally parallel with respect to one another.

9. An apparatus for loading and unloading of a container, having a front roller means, upon a roll-off vehicle as defined in claim 1 wherein said top frame means is substantially coplanar with respect to said sub frame means responsive to said top frame means being in the lowered position.

10. An apparatus for loading and unloading of a container, having a front roller means, upon a roll-off vehicle as defined in claim 1 wherein said container movement control means comprises:
 a) a cable means attached to said top frame means and attachable to the container to facilitate control of loading and unloading thereof with respect to said upper support surface of said top frame means;
 b) a reeve cylinder means mounted to said top frame means and being operative to extend and retract said cable means for urging movement of a container between the loaded and unloaded positions.

11. An apparatus for loading and unloading of a container, having a front roller means, upon a roll-off vehicle as defined in claim 10 wherein said container movement control means further includes a plurality of sheave means rotatably mounted with respect to said top frame means and being adapted to receive said cable means extending therearound to facilitate controlling and powering of movement of a container between the loaded and unloaded positions thereof.

12. An apparatus for loading and unloading of a container, having a front roller means, upon a roll-off vehicle as defined in claim 11 wherein said container movement control means includes a shoe means movably mounted to said top frame means to be moveable longitudinally therealong, said reeve cylinder being attached to said shoe means and being operative to extend and retract said shoe means responsive to extension and retracting of said reeve cylinder means.

13. An apparatus for loading and unloading of a container, having a front roller means, upon a roll-off vehicle as defined in claim 12 wherein said container movement control means includes a shoe sheave means rotatably movably mounted with respect to said shoe means and adapted to receive said cable means extending therearound to facilitate movement of a container between the loaded position and the unloaded position responsive to extension and retraction of said reeve cylinder means.

14. An apparatus for loading and unloading of a container, having a front roller means, upon a roll-off vehicle as defined in claim 13 wherein said top frame means defines a shoe track therealong to facilitate longitudinal movement of said shoe means therealong.

15. An apparatus for loading and unloading of a container, having a front roller means, upon a roll-off vehicle as defined in claim 13 wherein said shoe sheave means includes:
 a) an upper shoe sheave groove extending peripherally therearound to facilitate containment of said cable means extending circumferentially therearound; and
 b) a lower shoe sheave groove extending peripherally therearound to facilitate containment of said cable means extending circumferentially therearound.

16. An apparatus for loading and unloading of a container, having a front roller means, upon a roll-off vehicle as defined in claim 15 wherein said container movement control means further includes a lower front sheave means rotatably mounted to said top frame means and an upper front sheave means rotatably mounted to said top frame means.

17. An apparatus for loading and unloading of a container, having a front roller means, upon a roll-off vehicle as defined in claim 16 wherein said cable means is secured to said top frame means and extends rearwardly toward said shoe sheave means to extend around said lower shoe sheave groove thereof, said cable means then extending forwardly toward said lower front sheave means and therearound, said cable means then extending rearward toward said shoe sheave means and extending around said upper shoe sheave groove thereof, said cable means then extending forwardly to said upper front sheave means and therearound, said cable then being attached directly to a container to facilitate control of movement of a container between the unloaded and loaded positions thereof responsive to extension and retraction of said reeve cylinder means.

18. An apparatus for loading and unloading of a container, having a front roller means, upon a roll-off vehicle as defined in claim 17 wherein said upper front sheave means is obliquely oriented extending through said top frame means to facilitate exiting of said cable means extending therearound above said top frame means to facilitate detachable securement thereof with respect to a container.

19. An apparatus for loading and unloading of a container, having a front roller means, upon a roll-off vehicle as defined in claim 10 wherein said reeve cylinder means is contained entirely within said top frame means.

20. An apparatus for loading and unloading of a container, having a front roller means, upon a roll-off vehicle comprising having a frame:
  a) a subframe means attachable fixedly directly to the frame of the roll-off vehicle;
  b) a top frame means pivotally movably secured to said subframe means and defining an upper support surface for receiving of a container positioned thereupon;
  c) a lifting means attached to said subframe means and said top frame means and being operative to move said top frame means between an lifted position vertically inclined with respect to said subframe means to facilitate loading and unloading of containers and a lowered position to facilitate transport of a container selectively attached with respect to the roll-off vehicle, said lifting means comprising at least one lifting cylinder means attached to said subframe means and to said top frame means and being operative to be selectively extensible and retractable, said lifting cylinder means being operative when extended to move said top frame means toward said lifted position thereof and being operative responsive to retracting thereof to move said top frame means toward said lowered position, said lifting cylinder means being contained within said top frame means responsive to positioning of said top frame means in the lowered position, said top frame means being substantially coplanar with respect to said sub frame means responsive to said top frame means being in the lowered position;
  d) a container movement control means secured to said top frame means and attachable with respect to the container to facilitate moving of a container onto said upper support surface of said top frame means in a loaded position and to facilitate removing of a container from said upper support surface of said top frame means to an unloaded position, said container movement control means including:
    1) a cable means attached to said top frame means and attachable to a container to facilitate control of loading and unloading thereof with respect to said upper support surface of said top frame means;
    2) a reeve cylinder means mounted to said top frame means and being operative to extend and retract said cable means for urging movement of a container between the loaded and unloaded positions, said reeve cylinder means being contained entirely within said top frame means;
  e) a container locking means for detachably securing the container with respect to said top frame means responsive to positioning of the container in the loaded position, said container locking means being adapted to engage the front roller means of a container to facilitate securing of the container with respect to said top frame means responsive to positioning of the container in the loaded position, said container locking means including:
    1) a front hook means fixedly secured to said top frame means and adapted to engage the front rollers of a container for selective locking thereof with respect to said top frame means responsive to positioning of the container in the loaded position; and
    2) a locking strut means comprising a pair of locking struts having planar guide surfaces secured to said subframe means and extending outwardly therefrom to a position generally adjacent said front hook means to prevent disengagement of the front roller means of a container from engagement with said front hook means responsive to positioning of a container in the loaded position, said locking strut means being positioned extending upwardly adjacent and across said front hook means to define therebetween a retaining zone means adapted to receive and hold the front roller means of a container therewithin responsive to positioning of a container in the loaded position.

21. An apparatus for loading and unloading of a container, having a front roller means, upon a roll-off vehicle having a frame comprising:
  a) a subframe means attachable fixedly directly to the frame of the roll-off vehicle;
  b) a top frame means pivotally movably secured to said subframe means and defining an upper support surface for receiving of a container positioned thereupon, said top frame means defining a shoe track means extending longitudinally therealong;
  c) a lifting means attached to said subframe means and said top frame means and being operative to move said top frame means between an lifted position vertically inclined with respect to said subframe means to facilitate loading and unloading of containers and a lowered position to facilitate transport of a container selectively attached with respect to the roll-off vehicle, said lifting means comprising at least one lifting cylinder means attached to said subframe means and to said top frame means and being operative to be selectively extensible and retractable, said lifting cylinder means being operative when extended to move said top frame means toward said lifted position thereof and being operative responsive to retracting thereof to move said top frame means toward said lowered position, said lifting cylinder means being contained within said top frame means responsive to positioning of said top frame means in the lowered position, said top frame means being substantially coplanar with respect to said sub frame means responsive to said top frame means being in the lowered position, said lifting cylinder means comprising a first lifting cylinder and a second lifting cylinder extending generally parallel with respect to one another;
  d) the container movement control means secured to said top frame means and attachable with respect to a container to facilitate moving of a container onto said upper support surface of said top frame means in a loaded position and to facilitate removing of a container from said upper support surface of said top frame means to an unloaded position, said container movement control means including:
    1) a cable means attached to said top frame means and attachable to a container to facilitate control of loading and unloading thereof with respect to said upper support surface of said top frame means;

2) a reeve cylinder means mounted to said top frame means and being operative to extend and retract said cable means for urging movement of a container between the loaded and unloaded positions, said reeve cylinder means being contained entirely within said top frame means;

3) a shoe means movably mounted to said top frame means to be moveable longitudinally therealong, said reeve cylinder being attached to said shoe means and being operative to extend and retract said shoe means responsive to extension and retracting of said reeve cylinder means;

4) a shoe sheave means rotatably movably mounted with respect to said shoe means and adapted to receive said cable means extending therearound to facilitate movement of a container between the loaded position and the unloaded position responsive to extension and retraction of said reeve cylinder means, said shoe sheave means including: a. an upper shoe sheave groove extending peripherally therearound to facilitate containment of said cable means extending circumferentially therearound; and, a lower shoe sheave groove extending peripherally therearound to facilitate containment of said cable means extending circumferentially therearound;

5) a lower front sheave means rotatably mounted to said top frame means;

6) an upper front sheave means rotatably mounted to said top frame means, said upper front sheave means being obliquely oriented extending through said top frame means to facilitate exiting of said cable means therefrom above said top frame means to facilitate detachable securement thereof with respect to a container, said cable means being secured to said top frame means and extending rearwardly toward said shoe sheave means to extend around said lower shoe sheave groove thereof, said cable means then extending forwardly toward said lower front sheave means and therearound, said cable means then extending rearward toward said shoe sheave means and extending around said upper shoe sheave groove thereof, said cable means then extending forwardly to said upper front sheave means and therearound to a position above said top frame means, said cable then being attachable directly to a container to facilitate control of movement of a container between the unloaded and loaded positions thereof responsive to extension and refraction of said reeve cylinder means;

e) a container locking means for detachably securing the container with respect to said top frame means responsive to positioning of the container in the loaded position, said container locking means being adapted to engage the front roller means of a container to facilitate securing of the container with respect to said top frame means responsive to positioning of the container in the loaded position, said container locking means including:

1) a front hook means fixedly secured to said top frame means and adapted to engage the front rollers of a container for selective locking thereof with respect to said top frame means responsive to positioning of the container in the loaded position, said front hook means including a C-shaped hook means facing rearwardly along said top frame means, said C-shaped hook means adapted to receive the front wheel means of a container positioned therewithin for selectively locking the container in the loaded position; and 2) a locking strut means comprising a pair of locking struts having planar guide surfaces secured to said subframe means and extending outwardly therefrom to a position generally adjacent said front hook means to prevent disengagement of the front roller means of a container from engagement with said front hook means responsive to positioning of a container in the loaded position, said locking strut means being positioned extending upwardly adjacent and across said front hook means to define therebetween a retaining zone means adapted to receive and hold the front roller means of a container therewithin responsive to positioning of a container in the loaded position, said locking strut means including the guide surfaces extending outwardly away from said subframe means toward the position of said top frame means when located in said lifted position thereof to facilitating guiding of movement of said top frame means from said lifted position to said lowered position while maintaining proper alignment between said top frame means and said subframe means, said front hook means selectively locking a front roller means of a container therewithin to prevent movement up, down or longitudinally forwardly along the roll-off vehicle and said locking strut means selectively locking a front roller means of a container thereadjacent to prevent movement longitudinally rearwardly along the roll-off vehicle.

\* \* \* \* \*

UNITED STATES PATENT AND TRADEMARK OFFICE
CERTIFICATE OF CORRECTION

| | |
|---|---|
| PATENT NO. | : 8,029,228 B2 |
| APPLICATION NO. | : 11/900438 |
| DATED | : October 4, 2011 |
| INVENTOR(S) | : Marmur |

It is certified that error appears in the above-identified patent and that said Letters Patent is hereby corrected as shown below:

Claim 21, line 62, "refraction" should read --retraction--.

Signed and Sealed this
Twenty-ninth Day of November, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,029,228 B2 | Page 1 of 1 |
| APPLICATION NO. | : 11/900438 | |
| DATED | : October 4, 2011 | |
| INVENTOR(S) | : Marmur | |

It is certified that error appears in the above-identified patent and that said Letters Patent is hereby corrected as shown below:

Claim 21, column 16, line 62, "refraction" should read --retraction--.

This certificate supersedes the Certificate of Correction issued November 29, 2011.

Signed and Sealed this
Third Day of January, 2012

David J. Kappos
*Director of the United States Patent and Trademark Office*